United States Patent
Chakrabarti

(12) 
(10) Patent No.: US 10,210,458 B2
(45) Date of Patent: Feb. 19, 2019

(54) SELECTING USERS TO RECEIVE A RECOMMENDATION TO ESTABLISH CONNECTION TO AN OBJECT IN A SOCIAL NETWORKING SYSTEM

(71) Applicant: Facebook, Inc., Menlo Park, CA (US)

(72) Inventor: Deepayan Chakrabarti, Berkeley, CA (US)

(73) Assignee: Facebook, Inc., Menlo Park, CA (US)

( * ) Notice: Subject to any disclaimer, the term of this patent is extended or adjusted under 35 U.S.C. 154(b) by 293 days.

(21) Appl. No.: 14/083,582

(22) Filed: Nov. 19, 2013

(65) Prior Publication Data

US 2015/0142721 A1    May 21, 2015

(51) Int. Cl.
| | |
|---|---|
| G06N 7/02 | (2006.01) |
| G06N 7/04 | (2006.01) |
| G06N 7/06 | (2006.01) |
| G06N 7/08 | (2006.01) |
| G06N 7/00 | (2006.01) |
| G06Q 30/02 | (2012.01) |
| G06Q 50/00 | (2012.01) |

(52) U.S. Cl.
CPC .......... *G06N 7/00* (2013.01); *G06Q 30/0251* (2013.01); *G06Q 50/01* (2013.01)

(58) Field of Classification Search
USPC .......................................................... 706/52
See application file for complete search history.

(56) References Cited

U.S. PATENT DOCUMENTS

| | | | | |
|---|---|---|---|---|
| 8,250,145 | B2* | 8/2012 | Zuckerberg | G06Q 30/02 709/204 |
| 8,688,707 | B2* | 4/2014 | Marshall | G06Q 10/06 707/740 |
| 8,706,739 | B1* | 4/2014 | Song | G06F 17/30867 707/748 |
| 2010/0063993 | A1* | 3/2010 | Higgins | G06Q 10/10 709/203 |
| 2010/0076850 | A1* | 3/2010 | Parekh | G06Q 30/02 705/14.66 |
| 2010/0082360 | A1* | 4/2010 | Chien | G06Q 30/02 705/14.53 |
| 2010/0203876 | A1* | 8/2010 | Krishnaswamy | G06Q 30/02 455/418 |
| 2011/0264736 | A1* | 10/2011 | Zuckerberg | G06Q 30/02 709/204 |
| 2012/0110071 | A1* | 5/2012 | Zhou | G06Q 10/10 709/204 |
| 2012/0330774 | A1* | 12/2012 | Sadot | G06Q 30/08 705/26.3 |

(Continued)

*Primary Examiner* — Kakali Chaki
*Assistant Examiner* — Ababacar Seck
(74) *Attorney, Agent, or Firm* — Fenwick & West LLP

(57) ABSTRACT

A social networking system identifies users to receive a recommendation to establish a connection to an object maintained by the social networking system. The social networking system determines one or more classifiers identifying attributes of users to receive the recommendation based on attributes of users connected to the object and additional users connected to those users. The attributes of an additional user may be weighted by a factor that provides a measure of the overlap between the attributes of the additional user and a user connected to the object.

18 Claims, 3 Drawing Sheets

(56) References Cited

U.S. PATENT DOCUMENTS

2013/0031034 A1\* 1/2013 Gubin ............. G06Q 10/06393
                                                  706/12
2014/0143325 A1\* 5/2014 Lessin et al. ................ 709/204
2014/0222806 A1\* 8/2014 Carbonell ............. G06Q 30/02
                                                  707/732

\* cited by examiner

SELECTING USERS TO RECEIVE A RECOMMENDATION TO ESTABLISH CONNECTION TO AN OBJECT IN A SOCIAL NETWORKING SYSTEM

BACKGROUND

This disclosure relates generally to social networking systems, and in particular to recommending connections between users and objects on a social networking system.

A social networking system allows its users to connect to and communicate with other social networking system users. Users may create profiles on a social networking system that are tied to their identities and include information about the users, such as interests and demographic information, and share this information with other social networking system users by posting content on the social networking system or otherwise allowing other users to access this information. The users may be individuals or entities such as corporations or charities. Because of the increasing popularity of social networking systems and the increasing amount of user-specific information maintained by social networking systems, a social networking system provides an ideal forum for advertisers to increase awareness about products or services by presenting advertisements to social networking system users. Similarly, a social networking system allows groups to increase awareness about causes, events, or other information by providing information about themselves to the social networking system.

Commonly, to distribute information through a social networking system, a social networking system user generates an object maintained by the social networking system and posts content to object. For example, an organization generates a page maintained by the social networking system and posts news or photographs or responds to comments from other social networking system users via the page. Users of the social networking system may establish a connection with the page to receive updates and content from that page. Creating and maintaining objects, such as pages, may require a significant investment of resources by a user. For example, allocating time for providing continuous interaction with social networking system users via the page. Often, a threshold amount of interaction with an object offsets the resources used to create and maintain the object.

Conventionally, a social networking system recommends an object to additional social networking system users based on common attributes, such as interests and demographic information, between users connected to the object and the additional users. Social networking systems may also recommend objects to all users connected to a user currently connected to an object or determine a topic associated with an object and identify additional users based on the topic. However, for pages with less than a threshold number of connections to users, information associated with users currently connected to the object may be insufficient for normal extrapolation and conventional recommendation methods. For example, there are an insufficient number of common attributes between users connected to the object to accurately identify additional users likely to be interested in the object. Conversely, attributes that are irrelevant to determining a user's likely interest in an object may be overrepresented by the users connected to the object due to random fluctuations. Further, recommending a page to all social networking system users connected to a user currently connected to an object may result in recommendation of the page to users with no interest in the object that are unlikely to establish a connection with the page. It is also impractical to determine a topic associated with an object and use the topic to identify users to receive recommendations to connect to the object. For example, the language of text associated with the object may be unknown or the object may be newly created with little associated text or other information.

SUMMARY

To more accurately recommend an object to which less than a threshold number of social networking system users are connected, a social networking system uses information associated with users currently connected to the object to determine classifiers identifying users connected to the object. Examples of information used as a classifier include: user interests, demographic information of users, connections between users and other users, and membership in a group. Classifiers are used to identify additional users connected to at least one user connected to an object that have a threshold likelihood of being interested in the object to receive a recommendation to establish a connection to the object. In one embodiment, classifiers are determined based on the frequency with which they are associated with users connected to the object and the frequency with which they are associated with additional users who are connected to users connected to the object. The classifiers are used to identify additional users of the social networking system connected to at least one user connected to the object that have at least threshold likelihood of being interested in the object. The social networking system provides the users identified via the classifiers with a recommendation to establish a connection.

In some embodiments, a relationship factor is associated with each additional user connected to a user that is connected to an object, and the relationship factor is used to weight attributes of the additional user when determining classifiers associated with the object. The relationship factor provides a measure of an overlap of information between a user's connection to an object and an additional user's connection to the user connected to the object. In one embodiment, a relationship factor is determined based on a number of characteristics of a user connected to an object that match, or are similar to, characteristics of an additional user connected to the user connected to the object. For example, if a user connected to an object is associated with a user profile that specifies four attributes and none of these attributes match attributes specified in a user profile associated with an additional user connected to the user, the relationship factor between the user and the additional user is very low. However, if an alternative user connected to the user that is connected to the object has three of the four attributes in common with the user connected to the object, the relationship factor between the alternative user and the user connected to the object is high. Additionally, a type of connection between the user and the additional user may affect the relationship factor, as well as a number of connections between the additional user and users connected to the object.

When determining classifiers for recommending an object to social networking system users, the social networking system weights the attributes of additional users connected to a user connected to the object using the relationship factor between the user and various additional users to determine a score for various attributes of the additional users. An attribute having at least a threshold score is identified as a classifier. For example, a score for an attribute is a frequency with which the attribute is associated with users connected to an object combined with a frequency with which the attribute is associated with additional users connected to a user connected to the object weighted by the relationship factor. If an attribute's score is at least a threshold value, the attribute is used as a classifier. For example, an attribute's score is based on a number of users connected to an object having the attribute in their user profile combined with a number of additional users that are connected to a user connected to the object having attribute in their user profile multiplied by relationship factors associated with the additional users.

An attribute of a user connected to an object may be used as a classifier for the object if the attribute is associated with at least a threshold number or percentage of users connected to the object and/or additional users connected to users that are connected to the object. Alternatively, whether an attribute of users is used as a classifier for an object is determined by identifying additional users connected to a user that is connected to the object having an attribute being evaluated for use as a classifier and sending recommendations to establish a connection to the object to the identified additional users. Responses of the identified additional users to the recommendations determine whether the attribute is used as a classifier. Relationship factors associated with additional users may also be modified based on the responses to the recommendations that are received.

In another embodiment, the social networking system recommends an object to additional users connected to a user that is connected to the object based on relationship factors associated with the additional users. For example, the social networking system recommends an object to additional users connected to a user that is connected to the object having at least threshold relationship factor with the user connected to the object. In some embodiments, different relationship factors may be associated with different users based on their connection to the object. For example, a common relationship factor is associated with additional users that are connected to at least one user that is connected to an object so that attributes of users connected to the object are more heavily weighted than attributes of additional users connected to a user connected to the object when determining classifiers. If a common value is used as the relationship factor for additional users connected to at least one user connected to an object, the object may be recommended to additional users with a threshold number or percentage of classifiers as attributes.

In alternative embodiments, the social networking system determines classifiers based on attributes of social networking system users who are not connected to a user connected to the object and/or recommends an object to social networking system users who are not connected to a user connected to the object. For example, if two users are connected to an object and each user is connected to fewer than five additional users, the social networking system determines classifiers for the object based on the attributes of users that are connected to the additional users connected to a user connected to the object. Additionally, the social networking system may recommend the object to the users connected to the additional users based on the classifiers.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
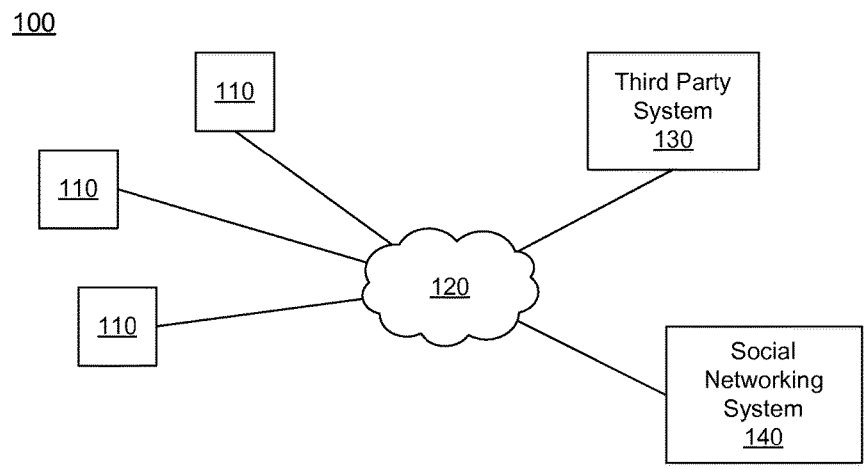
FIG. 1 is a block diagram of a system environment in which a social networking system operates, in accordance with an embodiment.

FIG. 1 is a block diagram of a system environment 100 for a social networking system 140. The system environment 100 shown by FIG. 1 comprises one or more client devices 110, a network 120, one or more third party systems 130, and the social networking system 140. In alternative configurations, different and/or additional components may be included in the system environment 100. The embodiments described herein can be adapted to online systems that are not social networking systems.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the social networking system 140, such as advertisements, content, or information about an application provided by the third party system 130.

Figure 2:
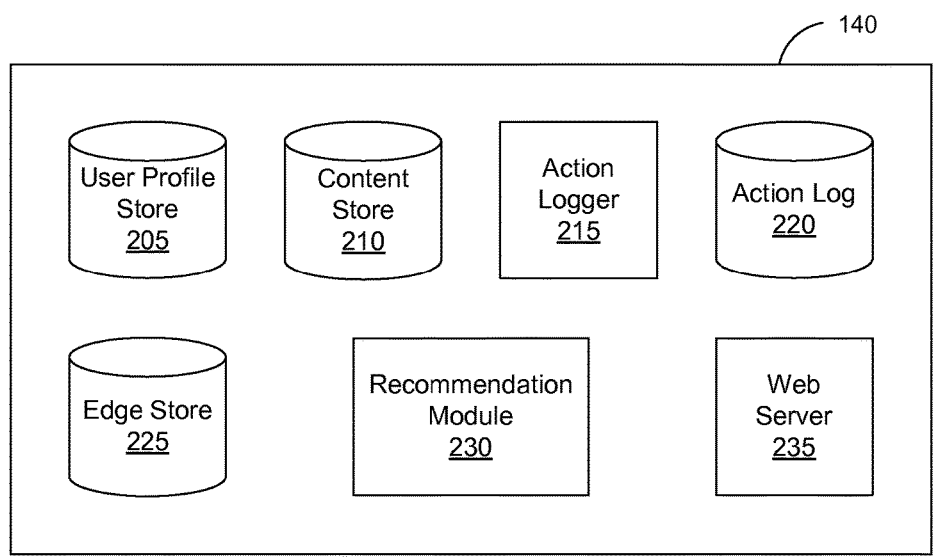
FIG. 2 is a block diagram of a social networking system, in accordance with an embodiment.

FIG. 2 is a block diagram of an architecture of the social networking system 140. The social networking system 140 shown in FIG. 2 includes a user profile store 205, a content store 210, an action logger 215, an action log 220, an edge store 225, a recommendation module 230, and a web server 235. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image. A user profile in the user profile store 205 may also maintain references to actions by the corresponding user performed on content items in the content store 210 and stored in the action log 220. Additionally, a user profile includes various attributes of a user, such as demographic information, location information, and information about interests associated with the user. As further described below, attributes from a user profile may be used to identify users to receive a recommendation to establish a connection with an object maintained by the social networking system 140.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the social networking system, events, groups or applications. In some embodiments, objects are received from third-party applications or third-party applications separate from the social networking system 140. In one embodiment, objects in the content store 210 represent single pieces of content, or content "items." Hence, social networking system users are encouraged to communicate with each other by posting text and content items of various types of media to the social networking system 140 through various communication channels. This increases the amount of interaction of users with each other and increases the frequency with which users interact within the social networking system 140.

In one embodiment, the content store 210 includes one or more recommendation units that suggest one or more actions to a user viewing the recommendation unit (a "viewing user") to increase the viewing user's interaction with the social networking system 140. For example, a recommendation unit provides a suggestion for the viewing user to establish a connection with another user as well as a link enabling the user to establish the connection. In other examples, a recommendation unit encourages the viewing user to invite another user to an event, identify a social networking system user in an image, join a group, or perform another suitable action with the social networking system 140. Each recommendation unit is associated with a score based on a value of the viewing user interacting with the recommendation unit (i.e., "converting" the recommendation unit by performing the recommended action) and/or on the likelihood that the viewing user will convert the recommendation unit. The score may be based on prior interaction with recommendation units by the viewing user, other users to whom the viewing user is connected, a probability of the viewing user interacting with the recommendation unit, or other criteria. Determination of a score for a recommendation unit is further described in U.S. patent application Ser. No. 13/549,080, filed on Jul. 13, 2012, which is hereby incorporated by reference in its entirety. Additionally, recommendation units presented to a user may be based at least in part on classifiers associated with an object and included in a user profile associated with the user; for example, if the user is associated with one or more classifiers associated with an object, a recommendation unit to interact with the object is presented to the user. Use of classifiers to present recommendation units to a user is further described below.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the social networking system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the social networking system 140. For example, an e-commerce website may recognize a user of a social networking system 140 through a social plug-in enabling the e-commerce website to identify the user of the social networking system 140. Because users of the social networking system 140 are uniquely identifiable, e-commerce websites, such as in the preceding example, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system 140, sharing a link with other users of the social networking system 140, and commenting on posts made by other users of the social networking system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 140 over time to approximate a user's interest in an object or another user in the social networking system 140 based on the actions performed by the user. A user's affinity may be computed by the social networking system 140 over time to approximate a user's interest for an object, interest, or other user in the social networking system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The recommendation module 230 determines classifiers to identify social networking system users to receive a recommendation to establish a connection to an object. For example, if less than a threshold number of users are connected to the object, the recommendation module 230 determines classifiers to identify users to receive a recommendation for an object when less than a threshold number of users are connected to the object. Alternatively, other suitable criteria may be used by the recommendation module 230 to determine when to identify classifiers for users to receive a recommendation for an object.

As further described below in conjunction with FIG. 4, to determine classifiers for an object, the recommendation module 230 identifies attributes of users connected to the object and attributes of additional users connected to at least one user that is connected to the object. Examples of attributes associated with a user include demographic information (e.g., age, location, gender, etc.), actions (e.g., check-ins), or other suitable information. In one embodiment, classifiers are determined based at least in part on the frequency with which attributes are associated with users connected to an object and associated with additional users connected to the user connected to the object. Attributes more frequently associated with users connected to the object or with users connected to users connected to a user connected to the object are more likely to be determined to be a classifier for the object. For example, an attribute of a user connected to an object as a classifier for the object if the attribute is associated with at least a threshold percentage of additional users connected to at least one user connected to the object. As an additional example, the social networking system 140 sends recommendations to establish a connection to an object to additional users connected to at least one user connected to the object based on one or more attributes likely to be classifiers. Responses to the recommendation from the additional users determine whether an attribute is a classifier for recommending the object to social networking system users.

In some embodiments, the recommendation module 230 may determine a relationship factor associated with each user connected to an object and associated with each additional user connected to a user connected to the object. The relationship factor describes an amount of overlap between attributes of a user connected to the object and an additional user connected to that user. For example, if a user connected to a page is a male between the ages of 18 and 25 who lives in Australia and enjoys mountain climbing, and an additional user connected to that user is a female between the ages of 35 and 50 who lives in Japan and has not indicated that she enjoys mountain climbing, the relationship factor associated with the additional user is very low because of the lack of common attributes. Hence, attributes associated with the additional user are significantly discounted when identifying classifiers for the page. However, if an another user connected to the user that is connected to the page is a male between the ages of 18 and 25 who lives in Canada and enjoys mountain climbing, the relationship factor associated with the other user high because the user and the other user share three of four attributes. Accordingly, attributes of the other user are heavily weighted when determining classifiers for the page. Determination of a relationship factor is further described below in conjunction with FIG. 4.

Further, the recommendation module 230 selects additional users connected to a user that connected to an object to receive a recommendation to establish a connection to the object. For example, the recommendation module 230 selects additional users to receive a recommendation to express a preference for a page, request content from the page, or establish any other suitable type of connection to the page. Recommendations to connect to an object may be sent to additional users based on the relationship factor associated with the additional users and a user connected to the object. For example, the recommendation module 230 communicates a recommendation to connect to an object to an additional user connected to a user that is connected to an object having at least a threshold relationship factor to the user connected to the object. In an embodiment where a common relationship factor is associated with each additional user connected to a user connected to an object, the object may be recommended to additional users having at least a threshold number or percentage of classifiers as attributes.

The web server 235 links the social networking system 140 via the network 120 to the one or more client devices 110, as well as to the one or more third party systems 130. The web server 235 serves web pages, as well as other content, such as JAVA®, FLASH®, XML and so forth. The web server 235 may receive and route messages between the social networking system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, WEBOS® or BlackberryOS.

Figure 3:
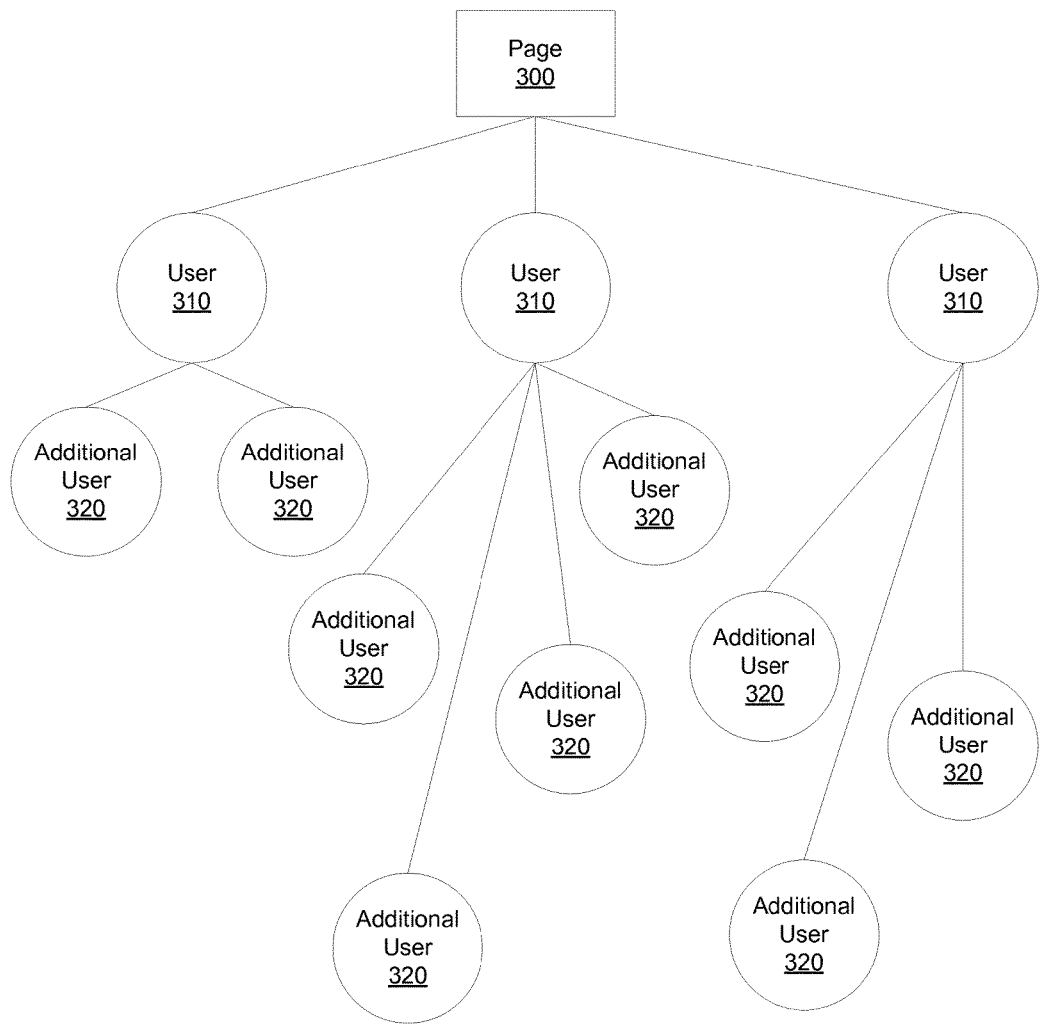
FIG. 3 is an example diagram of a relationship of an object maintained by a social networking system to users of the social networking system, in accordance with an embodiment.

Selecting Users to Receive a Recommendation to Establish a Connection to an Object FIG. 3 is an example diagram of a relationship between an object maintained by a social networking system 130 to social networking system users. As further described below in conjunction with FIG. 4, for an object 300 (e.g., a page) connected to less than a threshold number of users 310, attributes of users 310 connected to an object 300 as well as attributes of additional users 320 connected to a user 310 connected to the object 300 are used to identify additional users 320 likely to have an interest in the object 300. Various additional users 320 connected to a user 310 that is connected to an object 300 have different amounts of attributes in common with users 310 connected to the object 300.

If users do not provide attributes to the social networking system 140, the social networking system 140 may infer attributes to users based information associated with the users by the social networking system 140. For example, if a user profile does not include information indicating that a user has an interest in honor movies but does indicate that the user has an interest in comedies and documentaries, the social networking system 140 may infer that the user does not have an interest in horror movies because information in the user profile specifies the user's preference for other movie genre preferences. However, if the user profile does not include information identifying movie genre preferences, no information regarding movie genre preferences is inferred from the user profile; hence, the social networking system 140 infers the user's likely interest in horror movies based other social networking system users with similar attributes to the user that have provided information about movie genre preferences in their user profiles specifying an interest in honor movies.

Figure 4:
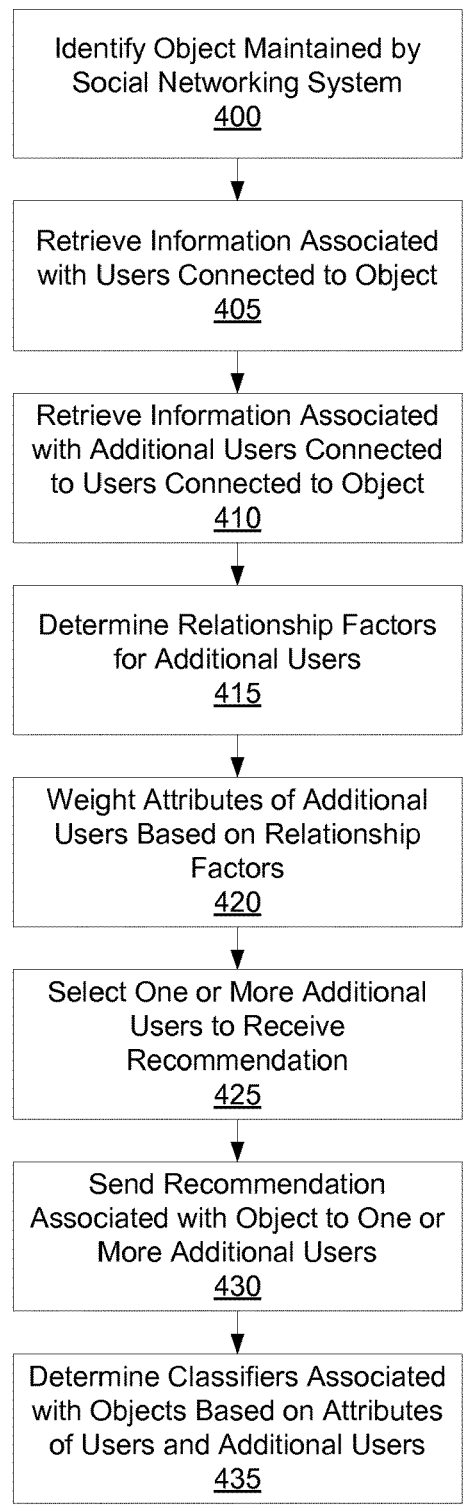
FIG. 4 is a flow chart of a method for recommending an object to users of a social networking system, in accordance with an embodiment.

FIG. 4 is a flow chart of a one embodiment of a method for recommending an object to social networking system users. The social networking system 140 identifies 400 an object 300 with less than a threshold number of connections to users 310 of the social networking system 140. For example, the social networking system 140 identifies 400 a page connected to fewer than 50 users 310. The social networking system 140 retrieves 405 information associated with users 310 connected to the object 300. For example, the social networking system 140 retrieves 405 information from the user profile store 205, the action log 220, and/or the edge store 225 describing demographic information, actions, interests, or other suitable information associated with the users 310 connected to the object 300. Information associated with additional users 320 connected to the users 310 that are connected to the object 300 is also retrieved 410 from the user profile store 205, the action log 220, and/or the edge store 225.

Based on the retrieved information associated with the users 310 and the retrieved information associated with the additional users 310, a relationship factor is determined 415 for additional users 320 connected at least one user 310 connected to the object 300. A relationship factor may be identified for each additional user 320 connected to each user 310 connected to the object 300. The relationship factor provides a measure of a number of attributes associated with a user 310 connected to the object 300 that are also associated with an additional user 320 connected to the user 310. In one embodiment, the relationship factor of an additional user 320 is proportional to the number or the percentage of attributes associated with the additional user 320 that are also associated with a user 310 connected to the object 300. For example, the relationship factor is a number between 0 and 1 that may be used to weight attributes of additional users 320 connected to a user 310 that is connected to an object 300 when determining classifiers for the object 300. Alternatively, a single relationship factor is associated with each additional user 320 connected to a user 310 that is connected to the object 300, so attributes of the additional users 300 are equally weighted.

In some embodiments, a relationship factor is also determined 415 for the users 310 connected to the object 300 to represent the connection between different users 310 and the object 300. For example, a relationship factor is determined 415 for each user 310 connected to the object 300. A common relationship factor may be associated with each user 310 connected to the object 300. In one embodiment, a relationship factor associated with users 310 connected to the object 300 is specified as a higher value than relationship factors determined 415 for additional users 320 connected to a user 310 that is connected to the object 300. This allows attributes of the users 310 connected to the object 300 to be more heavily weighted than attributes of additional users 320 connected to a user 310 that is connected to the object 300.

The relationship factor of an additional user 320 may also be proportional to a number of connections between the additional user 320 and users 310 connected to the object 300. For example, if an additional user 320 is connected to three users 310 that are connected to the object 300, the relationship factor for the additional user 320 is higher than if the additional user 320 was connected to a single user 310 connected to the object 300. A type of connection between the additional user 320 and a user 310 connected to the object 300 may also affect the relationship factor of the additional user 310. For example, if a user 310 connected to an object 300 has a connection with an additional user 320 indicating the user 310 is a friend of the user 310, the relationship factor for the additional user is lower than if the additional user 320 and user 310 have a connection indicating they are family members.

Based at least in part on the relationship factors for additional users 320, attributes of the additional users 320 connected to a user 310 that is connected to the object 300 are weighted 420. In one embodiment, attributes of each additional user 320 connected to a user 310 connected to the identified object 300 are weighted 420 based on the relationship factor associated with the additional user 320. For example, if an additional user 320 is associated with many attributes that are also associated with a user 310 connected to an object 300, attributes associated with the additional user 320 are weighted higher than attributes associated with another additional user 320 connected to the user 310 that is connected to the object 300 having fewer attributes associated with the user 310 connected to the object 300. Relationship factors associated with users 310 connected to the identified object 300 may also be used to weight 420 attributes of users 310 connected to the object 300. For example, the attributes of users 310 connected to the object 300 are weighted 420 more heavily than attributes of additional users 320 connected to a user 310 that is connected to the object 300 because of the direct connection between the user 310 and the identified object 300.

One or more additional users 320 connected to a user 310 that is connected to the object 300 are selected 425 to receive a recommendation to establish a connection to the object 300. In one embodiment, additional users 320 may be selected 425 to receive a recommendation based on the relationship factors associated with the additional users 320. For example, additional users 320 with at least a threshold relationship factor are selected 425 to receive the recommendation. If a common relationship factor is associated with each additional user 320 connected to at least one user 310 that is connected to the identified object 300, additional users 320 having at least a threshold number or percentage of classifiers as attributes are selected 425 to receive the recommendation. The social networking system 140 sends 430 a recommendation to establish a connection to the object 300 to the selected additional users 320. For example a recommendation unit identifying the object 300 and suggesting a user establish a connection to the object is sent 430 to the selected additional users 320.

Classifiers for the object 300 are determined 435 based at least in part on attributes of users 310 connected to the object 300 and attributes of additional users 320 connected to a user 310 that is connected to the object 300 weighted by relationship factors associated with the various users. For example, a score is determined for various attributes of users 310 and additional users 320 based on a frequency with which an attribute is associated with users 310 connected to the object 300 combined with a frequency with which the attribute is associated with additional users 320 weighted by the relationship factors associated with additional users 320. If an attribute has a score of at least a threshold value, the attribute is determined 435 to be a classifier associated with the object 300. If a common relationship factor is associated with each additional user 320 connected to a user 310 that is connected to the identified object 300, classifiers are determined 435 to be one or more attributes common to a threshold number or to a threshold percentage of users 310 connected to the identified object 300 and additional users 320 connected to a user 310 that is connected to the identified object 300. For example, the an attribute is determined 435 to be a classifier for the object 300 if the attribute is associated with at least 80% of the users 310 connected to the object 300 and at least 40% of the additional users 320 connected to a user 310 that is connected to the object 300.

The social networking system 140 may send 430 recommendations to establish a connection to the object 300 to additional users 320 connected to a user 310 that is connected to the object 300 based on one or more attributes of the additional users 320 identified as candidate classifiers. For example, recommendations are sent 430 to additional users 320 having a threshold percentage of attributes identified as potential classifiers. Attributes of the additional users 320 are determines 435 to be classifiers for the object 300 based at least in part on responses received from additional users 320 receiving the recommendations. For example, if at least a threshold percentage of additional users 320 having a common attribute and that received a recommendation establish a connection to the identified object 300, the common attribute is determined 435 to be a classifier of the identified object 300. Additionally, the relationship factors associated with users 310 and additional users 320 may be adjusted based on the responses to the recommendations received from additional users 320. For example, the relationship factor associated with additional users 320 having an attribute is increased while the relationship factor associated with additional users 320 that do not have the attribute is decreased when at least a threshold percentage of additional users 320 having the attribute and receiving a recommendation establish a connection to the object 300.

SUMMARY

The foregoing description of the embodiments has been presented for the purpose of illustration; it is not intended to be exhaustive or to limit the embodiments to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Some embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Some embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the embodiments be limited not by this detailed description, but rather by any claims that issue on an application based hereon. Accordingly, the disclosure of the embodiments is intended to be illustrative, but not limiting, of the scope of the embodiments, which is set forth in the following claims.

What is claimed is:

1. A method comprising:
    identifying a brand page within a social networking system that is maintained by the social networking system and is established by an entity, the brand page having less than a threshold number of connections to it by users of the social networking system, wherein connections to the brand page result in users receiving within the social networking system content posted to the brand page by the entity over a period of time;
    identifying a plurality of users of the social networking system connected to the brand page;
    responsive to identifying the users connected to the brand page, for each user:
        identifying one or more additional users of the social networking system that are connected to the user within the social networking system,
        retrieving information describing one or more attributes of the user connected to the brand page, and
        retrieving information describing one or more attributes associated with the one or more additional users,
        for each of the one or more additional users:
            determining a relationship factor between the user connected to the brand page and an additional user connected to the user, the determined relationship factor describing a number of attributes of the user connected to the brand page matching a number of attributes of the additional user,
            weighting the one or more attributes of the additional user based on the relationship factor, and
            selecting at least one of the one or more weighted attributes as classifiers for the brand page based on the weighting;
    identifying one or more of the additional users to receive a recommendation to establish a connection with the brand page based at least in part on the determined relationship factor having at least a threshold value;
    sending the recommendation to the one or more identified users;
    receiving, by the social networking system, a response to the recommendation from at least one of the plurality of identified users requesting to establish a connection to the brand page, that was recommended;
    connecting the responding user to the brand page by forming an edge in the social networking system between the responding user and the brand page, the edge representing an interaction between the responding user and the brand page, the edge stored by the social networking system in an edge store; and
    based on the edge stored within the social networking system, sending by the social networking system to the responding user a content posted to the brand page over a period of time.

2. The method of claim 1, wherein the one or more of the additional users to receive the recommendation to establish the connection with the brand page comprise one or more additional users having a determined value having at least a threshold value.

3. The method of claim 1, further comprising:
    determining one or more attributes associated with users of the social networking system having a threshold likelihood of having an interest in the brand page.

4. The method of claim 3, further comprising:
    identifying one or more users of the social networking system associated with at least a threshold number of the determined one or more attributes.

5. The method of claim 3, further comprising:
    identifying one or more users of the social networking system associated with at least a threshold percentage of attributes matching the determined one or more attributes.

6. The method of claim 3, wherein determining the one or more attributes associated with users of the social networking system having the threshold likelihood of having the interest in the brand page comprises:

determining scores for each attribute associated with at least one additional user, a score for an attribute based at least in part on the weight associated with the attribute; and selecting attributes associated with the one or more additional users based at least in part on the determined scores.

7. The method of claim 3, wherein determining the one or more attributes associated with users of the social networking system having the threshold likelihood of having the interest in the brand page comprises:

receiving responses to the recommendations from a set of the one or more identified users;

modifying values describing the number of attributes associated with the one or more users from which responses were received matching attributes associated with the user based at least in part on the received responses;

determining scores for each attribute associated with at least one additional user, a score for an attribute based at least in part on a value associated with a user associated with the attribute; and selecting attributes associated with one or more additional users based at least in part on the determined scores.

8. A method comprising:

identifying a page within a social networking system that is maintained by the social networking system and is established by an entity, the page having less than a threshold number of connections to it by users of the social networking system, wherein connections to the page result in users receiving within the social networking system content posted to the page by the entity over a period of time;

identifying a plurality of users of the social networking system connected to the page;

responsive to identifying the users connected to the page, for each user:

identifying one or more additional users of the social networking system connected to the user, retrieving information describing one or more attributes of the user connected to the page, and retrieving information describing one or more attributes associated with the one or more additional users;

identifying one or more attributes associated with users of the social networking system, the users having an interest in the page based at least in part on the one or more attributes of the user connected to the page matching one of the one or more attributes of the additional users;

weighting the one or more attributes of the additional user based on the relationship factor;

selecting at least one of the one or more weighted attributes as classifiers for the page based on the weighting;

identifying one or more users of the additional users connected to the user having one or more of the identified one or more attributes to receive a recommendation associated with the page;

sending the recommendation associated with the page to the identified one or more users;

receiving, by the social networking system, a response to the recommendation from at least one of the plurality of identified users requesting to establish a connection to the page, that was recommended;

connecting the responding user to the page by forming an edge in the social networking system between the responding user and the page, the edge representing an interaction between the responding user and the page, the edge stored by the social networking system in an edge store; and based on the edge stored within the social networking system, sending by the social networking system to the responding user a content posted to the page over a period of time.

9. The method of claim 8, wherein identifying one or more attributes associated with users of the social networking system having the interest in the page based at least in part on the one or more attributes of the user connected to the page and the one or more attributes of the additional users comprises:

determining a value for each of the one or more additional users, the value for an additional user describing an amount of overlap between a number of attributes associated with the user connected to the page and an additional user connected to the user.

10. The method of claim 9, wherein identifying one or more users of the additional users connected to the user having one or more of the identified one or more attributes to receive a recommendation associated with the page comprises:

identifying one or more additional users associated with a value having at least a threshold value.

11. The method of claim 9, wherein identifying one or more attributes associated with users of the social networking system having the interest in the page comprises:

determining scores for each attribute associated with at least one additional user, a score for an attribute based at least in part on the weight associated with the attribute; and selecting attributes associated with one or more additional users based at least in part on the determined scores.

12. The method of claim 9, wherein identifying one or more attributes associated with users of the social networking system having the interest the page comprises:

receiving responses to the recommendations from a set of the one or more identified users;

modifying values describing the number of attributes associated with the one or more users from which responses were received matching attributes associated with the user based at least in part on the received responses;

determining scores for each attribute associated with at least one additional user, a score for an attribute based at least in part on a value associated with a user associated with the attribute; and selecting attributes associated with one or more additional users based at least in part on the determined scores.

13. The method of claim 8, wherein identifying one or more users of the additional users connected to the user having one or more of the identified one or more attributes to receive a recommendation associated with the page comprises:

identifying one or more additional users associated with at least a threshold number of the identified one or more attributes.

14. The method of claim 8, wherein identifying one or more users of the additional users connected to the user having one or more of the identified one or more attributes to receive a recommendation associated with the page comprises:

identifying one or more additional users associated with at least a threshold percentage of attributes matching the identified one or more attributes.

15. The method of claim 8, wherein the page is connected to less than a threshold number of users of the social networking system.

16. A system comprising:
a processor; and
a computer-readable storage medium coupled to the processor, the computer-readable storage medium having instructions encoded thereon that, when executed by the processor, cause the processor to:
identify a brand page within a social networking system that is maintained by the social networking system and is established by an entity, the brand page having less than a threshold number of connections to it by users of the social networking system, wherein connections to the brand page result in users receiving within the social networking system content posted to the brand page by the entity over a period of time,
identify a plurality of users of the social networking system connected to the brand page,
responsive to identifying the users connected to the brand page, for each user:
identify one or more additional users of the social networking system that are connected to the user within the social networking system,
retrieve information describing one or more attributes of the user connected to the brand page,
retrieve information describing one or more attributes associated with the one or more additional users, and
for each of the one or more additional users,
determine a relationship factor between the user connected to the brand page and an additional user connected to the user, the determined relationship factor describing a number of attributes of the user connected to the brand page matching a number of attributes of additional user,
weighting the one or more attributes of the additional user based on the relationship factor, and
selecting at least one of the one or more weighted attributes as classifiers for the brand page based on the weighting;
identify one or more of the additional users to receive a recommendation to establish a connection with the brand page based at least in part on the determined relationship factor having at a threshold value;
send the recommendation to the one or more identified users;
receive, by the social networking system, a response to the recommendation from at least one of the plurality of identified users requesting to establish a connection to the brand page, that was recommended;
connect the responding user to the brand page by forming an edge in the social networking system between the responding user and the brand page, the edge representing an interaction between the responding user and the brand page, the edge stored by the social networking system in an edge store; and
based on the edge stored within the social networking system, send by the social networking system to the responding user a content posted to the brand page over a period of time.

17. The system of claim 16, wherein the computer-readable storage medium further has instructions encoded thereon that, when executed by the processor, cause the processor to:
determine one or more attributes associated with users of the social networking system having a threshold likelihood of having an interest in the brand page.

18. The system of claim 17, wherein the instructions that cause the processor to determine one or more attributes associated with users of the social networking system having the threshold likelihood of having an interest in the page comprises instructions that, when executed by the processor, cause the processor to:
determine scores for each attribute associated with at least one additional user, a score for an attribute based at least in part on the weight associated with the attribute; and
select attributes associated with one or more additional users based at least in part on the determined scores.

* * * * *